United States Patent [19]

Waatti et al.

[11] Patent Number: 4,540,715

[45] Date of Patent: Sep. 10, 1985

[54] SURFACTANT AND ALKALI METAL CITRATE COMPOSITION FOR RECHARGING A WATER SOFTENER

[75] Inventors: Kurt J. Waatti, Woodstock, Ill.; Daniel R. Border, Wadsworth, Ohio

[73] Assignee: Morton Thiokol, Inc., Chicago, Ill.

[21] Appl. No.: 529,311

[22] Filed: Sep. 6, 1983

[51] Int. Cl.$^3$ .................. C08D 5/20; C11D 1/12; C11D 1/755

[52] U.S. Cl. .................................. 521/26; 252/558

[58] Field of Search ..................... 521/26; 252/558

[56] References Cited

U.S. PATENT DOCUMENTS

| | | |
|---|---|---|
| 2,769,787 | 11/1956 | Diamond . |
| 3,216,932 | 11/1965 | Heiss et al. ........................ 521/26 |
| 3,299,617 | 1/1967 | Dunklin . |
| 3,454,503 | 7/1969 | Blankenborn et al. . |
| 3,748,285 | 7/1973 | Wiltsey et al. . |
| 4,071,446 | 1/1978 | Kunin . |
| 4,083,782 | 4/1978 | Kunin . |
| 4,116,860 | 9/1978 | Kunin . |
| 4,203,873 | 5/1980 | Suzuki et al. ..................... 252/558 |
| 4,375,421 | 3/1983 | Rubin et al. ...................... 252/558 |

*Primary Examiner*—Joseph L. Schofer
*Assistant Examiner*—Peter F. Kulkosky
*Attorney, Agent, or Firm*—Gerald K. White; George F. Wheeler

[57] ABSTRACT

Salt composition and method for regenerating spent water softener cation exchange resins, to remove or prevent the accumulation of iron in its various forms, insolubles, and oily deposits. The dry composition comprises from about 10 ppm to about 400 ppm of an alkylated diphenyl oxide disulfonate surfactant, from about 500 ppm to about 8000 ppm of sodium citrate, and as the remainder of the composition sodium chloride. The composition is preferably provided and used in the form of compacted products. The method for regenerating the spent cation exchange resin bed comprises the step of contacting the resin bed with an aqueous brine solution containing from about 25 to about 1200 ppm sodium citrate and from about 0.5 to about 60 ppm of alkylated diphenyl oxide disulfonate surfactant. The method is conveniently practiced by dissolving the composition first set forth above in the water of a conventional brine tank, using known technology.

5 Claims, No Drawings

SURFACTANT AND ALKALI METAL CITRATE COMPOSITION FOR RECHARGING A WATER SOFTENER

TECHNICAL FIELD

The present invention relates to salt compositions for regenerating cation exchange resin beds in water softeners, particularly salt compositions containing ingredients for continuously inhibiting resin fouling by iron, insolubles, oils, and other contaminants commonly found in water supplies.

BACKGROUND ART

Water softening systems are used in households and by industry to replace hardness cations such as calcium and magnesium with sodium ions by passing an incoming water supply through a bed of cationic exchange resin beads or particles. When the ion exchange resin bed periodically becomes saturated with ions removed from the incoming water, and depleted of sodium ions, it is recharged by passing a brine solution consisting essentially of sodium chloride through the resin bed. This replenishes the bed with sodium ions and removes the calcium, magnesium, or other ions previously removed from the incoming water.

The exchange capacity of an ion exchange resin bed deteriorates as impurities in the incoming water collect in the resin bed and are not removed by the recharging process. Sooner or later, depending on the level of maintenance of the resin bed and the characteristics of the water supply being softened, the resin becomes "fouled", meaning that the resin bed's capacity to soften water has diminished so much that the resin must be specially treated to restore its softening capacity.

The presence of iron in the incoming water supply is the most common cause of resin fouling. Iron can exist in the water supply as clear water iron, red water iron, bacterial iron, colloidal iron, or tannate iron.

Clear water iron is iron in the divalent (ferrous), soluble state. Clear water iron is not visible when the water is drawn, but when the water is allowed to stand for a prolonged period the ferrous ions are oxidized by air to become ferric or trivalent ions, which settle as a precipitate of ferric hydroxide. The iron may also oxidize after having been exchanged into a resin bed, which will prevent it from being removed by regeneration.

Red water iron is already oxidized to the ferric state when it reaches the water softener. Water containing red water iron is cloudy and orange when drawn. This form of iron may be filtered by the resin bed or may be passed and be present in the softened water.

Bacterial iron is a third troublesome form of iron, and is caused by iron crenothrix bacteria which feed on the iron in the water supply. These bacteria thrive in water softener resin beds supplied with ample iron, and the resulting biomass clouds the water system, creates a bad taste and odor in the softened water, and occasionally releases large, unsightly masses of rust colored material.

Colloidal iron is similar to red water iron, but is composed of particles too small to settle. Colloidal iron will normally pass directly through a water softener.

Finally, tannate iron, which is quite similar in appearance to colloidal iron, is ferric iron complexed and held in solution by tannates or other naturally occurring soil ingredients. This final form of iron usually passes through a water softening resin bed.

Iron present in any of the previously discussed forms can foul the resin bed. Oxidation of ferrous iron captured by the resin beads can crack them, thereby physically degrading the resin bed as well.

The iron problem is well known in the softening art, and attempts have been made to remove iron in all its forms from water softening resin beds. Other chelating compounds for sequestering iron are listed in column 2, lines 47 through 53 of U.S. Pat. No. 3,454,503, issued to Blankenhorn et al. on July 8, 1969. Among the iron chelating materials disclosed therein is citric acid. U.S. Pat. No. 2,769,787, issued to Diamond on Nov. 6, 1956, also discloses a method for regenerating cation exchange resins fouled by iron by adding to the brine regeneration medium any of a variety of organic acids, particularly citric acid. Citric acid is used commercially in water softening salt compositions, and does remove iron from the system, but citric acid or the mineral acids suggested in some other references can accelerate damage to metal or plastic materials found within a water softener if they are used regularly to recharge the system.

U.S. Pat. Nos. 4,071,446 and 4,116,860, respectively issued to Kunin on Jan. 31, 1978 and Sept. 26, 1978, disclose compositions for regenerating resin beds, comprising a major proportion of an alkali metal chloride, a minor proportion of an alkali metal carbonate, and as the remainder an alkali metal carboxylate chelating agent. Among the many carboxylates disclosed in these references are sodium and potassium citrates. The resins disclosed therein, further characterized in U.S. Pat. No. 4,083,782, are weak acid cation exchange resins adapted to exchange sodium or potassium ions for hydrogen cations, thereby reducing the acidity of the incoming water. No disclosures of the iron problem or the present solution to that problem are made in the Kunin patents. Furthermore, Kunin suggests extremely high concentrations of sodium citrate (5 to 15 per cent of the exemplary compositions).

Oily materials and insoluble particulate matter (which can include precipitated ferric iron) in the water supply also foul cation exchange resins. The particulate matter is bound to the resin beads by the hydrophobic oily matter, and then defies removal when the resin bed is backwashed or otherwise treated with aqueous solutions. The insolubles bound to the resin beads limit the contact area exposed to incoming water, thus fouling the resin bed. U.S. Pat. No. 3,216,932, issued to Heiss et al. on Nov. 9, 1965, discloses a composition consisting predominantly of salt, and containing minor proportions of (1) a dialkali metal sulfonate of an alkylated diphenyl ether; (2) a dialkali metal sulfonate of dinaphthylmethane; and (3) an aqueous mineral acid. The mineral acid can generate fumes which attack metal and plastic components of the water softener, and the surfactant is used at a higher level than is desirable for economic reasons. Heiss also teaches away from the use of sequestering agents. (See column 1, lines 54–63).

Hofheins, "Cleaning Methods for Fouled Cation Exchange Resins", *Water Technology*, Feb. 1983, pages 21–25, 33, and 41 discusses how to clean resins fouled by various contaminants, particularly iron, by occasional treatment with sodium hydrosulfite, hydrochloric acid, or polyphosphate or organophosphorus sequestering compounds. This article also recommends the removal of fats, oils, and the like by contacting the resin bed with caustic solutions, which are not suitable for household use.

Another class of products, for restoring resin beds which are so fouled that regeneration would be pointless without pretreatment, also employs surfactants. These materials are not adapted for regular use in a water softener. The patents disclosing products of this type include U.S. Pat. No. 3,748,285, issued to Wiltsey on July 24, 1973. Another patent, which discloses the use of a surfactant in a special process for removing entrapped air from a water softener, is U.S. Pat. No. 3,299,617, issued to Dunklin on Jan. 24, 1967. Here again, the composition is not intended to regenerate the resin bed, but is used for a special purpose.

The prior art known to the inventors does not suggest combining a sequestering agent with a surfactant, particularly in the context of a resin regenerating composition for regular use to maintain the cleanliness of the resin, comprising salt, a sequestering agent, and a surfactant.

The art also has not recognized the special characteristics required of a surfactant for use in a salt composition intended for routinely regenerating cation exchange resin beds. Surfactants for this purpose must be anionic, as cationic surfactants would bind to the resin exchange sites and nonionic surfactants are not soluble in brine. The candidate surfactant must be safe for human consumption at low levels in drinking water, as minute quantities of the regenerating composition might be carried into the treated water supply. The surfactant must be low foaming at the normal level of use, to prevent the introduction of air into the softener. The surfactant must be soluble in saturated brine (which few surfactants are). It must be compatible with hard water, so no insoluble precipitates are formed. Finally, the surfactant must be sufficiently inexpensive to be economically justifiable and must be stable at the high temperatures encountered when compacting granulated salt to form products such as pellets.

SUMMARY OF THE INVENTION

The inventors have discovered water softening regeneration salt compositions combining low levels of alkylated diphenyl oxide disulfonate surfactants with an alkali metal citrate, preferably sodium citrate, as a sequestering agent. Regular use of such compositions to regenerate water softener resin beds can increase the softening capacity of resin beds already in service and can protect cationic exchange resin beds against deterioration due to the accumulation of iron, other insolubles, oily and fatty deposits, and other impurities derived from the water supply.

Furthermore, the inventors have discovered that the same treatment increases the brine generating capacity of the system for each regeneration cycle, reduces the deleterious caking and bridging of salt pellets in the portion of the water softening salt which is intended to be above the level of water in the brine tank, and solubilizes or prevents formation of scum in the brine tank, even if iron is present in the water supply or in the salt.

Sodium citrate provides much of the sequestering ability of citric acid, but (unlike citric acid) does not tend to cause acid fumes in the water softener or otherwise accelerate deterioration of the metal or plastic parts therein.

The preferred alkylated diphenyl oxide disulfonate surfactants have the following formula:

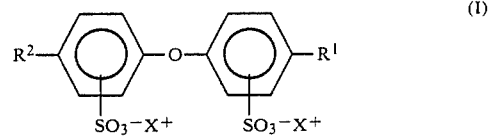

wherein X is an alkali metal ion, preferably a sodium ion, $R^1$ is an aliphatic moiety having from 6 to 16 carbon atoms, preferably an n-decyl moiety, and $R^2$ is selected from hydrogen and $R^1$, and preferably is hydrogen or an n-decyl moiety.

Surprisingly, the inventors have found that combinations of the citrate and surfactant work better than either ingredient taken alone.

The preferred compositions for use herein comprise from about 10 parts per million (ppm) to about 400 ppm, and preferably about 75 ppm, of an alkylated diphenyl oxide disulfonate surfactant; from about 500 ppm to about 8,000 ppm, and preferably about 770 ppm, of sodium citrate (which is equivalent to 880 ppm of sodium citrate dihydrate); and as the remainder sodium chloride. (The inventors do not, however, exclude other ingredients which do not detract appreciably from the utility of the compositions disclosed herein.)

Another aspect of the invention is a method for regenerating the spent cation exchange resin bed of a water softener, comprising the step of contacting the resin bed with an aqueous solution containing from about 50,000 to about 150,000 ppm of sodium chloride, from about 25 to about 1,200 ppm of sodium citrate, and from about 0.5 to about 60 ppm of an alkylated diphenyl oxide sulfonate surfactant. This method can be employed routinely to regenerate the resin bed of a water softener, rather than waiting until the resin bed becomes fouled before taking more extreme measures. Also, attention to the condition of the resin bed is not deferred until failure of the system, meaning that the supply of soft water need not be interrupted while service for the water softener is sought.

DESCRIPTION OF PREFERRED EMBODIMENT

The surfactants useful herein, represented by formula I above, are commercially available under the trademark DOWFAX from the Dow Chemical Company, Midland, Mich. The preferred commercially available surfactant for use herein is DOWFAX 3B2, which is a mixture of the following two species:

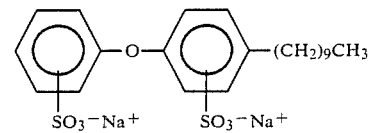

and

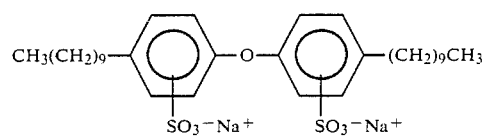

The inventors contemplate that either of these species or any mixture thereof is useful herein as a surfactant.

The commercial material is approximately 45% of the surfactant dissolved in water.

Sodium citrate is available from a wide variety of commercial sources, and the preferred material is provided as granules of sodium citrate dihydrate which pass through a 20 mesh screen and are substantially retained on a 70 mesh screen. In the preferred embodiment, the particle size distribution of the sodium citrate dihydrate feedstock is similar to the particle size distribution of the sodium chloride feedstock.

The granular sodium chloride feedstock preferred herein is that which has conventionally been compacted for use as water softening products.

Although an individual consumer could practice the method invention taught herein by purchasing the individual components and dissolving them in water to form a brine, in the preferred mode of practicing the invention, the components of the composition are compacted to provide a unitary composition. To pelletize the composition the sodium citrate, sodium chloride, and surfactant feedstocks are mixed together homogeneously and passed through conventional compacting equipment.

EXAMPLES

The following examples are provided to illustrate the invention and its practice. The scope of the invention is not limited by these examples, and is defined in the claims concluding this specification.

EXAMPLE I

The following laboratory procedure was employed to measure the effect of the improved salt composition on the exchange capacity of fouled resins.

1. Water softener simulators, approximately 1/45 the size of a full scale unit, were modeled after a residential water softener. These simulators consisted of upright 1000 ml soil test cylinders $16\frac{3}{8}$ inches (429 mm) tall, having an inside diameter of $2\frac{3}{4}$ inches (60 mm), plugged at the top by a rubber stopper penetrated by two glass tubes. The center tube extended to the bottom of the cylinder and was fitted with a fine-mesh screen to prevent resin from washing out. The lower end of the side tube was flush with the bottom of the stopper. Influent water could be directed down the center tube (upflow) for backwashing the resin or through the side tube (downflow) to simulate the brine, rinse and service cycles of a softener.

2. Approximately 200 ml of glass beads were placed at the bottom of the cylinders before adding exactly 500 ml. of packed-down resin beads collected from residential water softeners. (The beads were measured by placing a graduated cylinder containing resin beads on a vibrating table until settling was complete, then resin beads were added or removed to provide exactly 500 ml). The remaining space was filled with water and the stopper was tightly secured to close the system.

3. The resin was backwashed with 2500 ml. of deionized water. The flow rate was adjusted to obtain 50% expansion of the resin bed.

4. The resins were regenerated with 802 g. of 10% sodium chloride solution (10 pounds (4.5 kg) per cubic foot (28 liters) of resin) containing test additives or no additives (control). The brining flow rate was 50 ml./min.

5. After brining, the resin was rinsed slowly with 1500 ml. of deionized water at 130 ml./min., followed by a fast rinse consisting of 1160 ml. of deionized water at 300 ml./min.

6. Effluents from the brine and rinse cycles were collected in one gallon glass jars for subsequent analysis.

7. The resin was then exhausted with 12 liters of synthetic hard water at a flow of 70 ml./min. ("Exhausted" means that the influent hardness was equal to the effluent hardness). The synthetic hard water was deionized water to which $CaCl_2$ and $FeSO_4$ were added and allowed to stand overnight to provide 200 grains of hardness per gal. (expressed as $CaCO_3$), (equivalent to 684 milliequivalents (meq.) of hardness per ml. of water) and 30 ppm iron.

8. Steps 4 through 8 were repeated for 3-4 complete cycles.

9. On the final exhausting step, incremental samples of the effluent water (soft water) were continuously taken and the cumulative volume of water through the simulator was recorded with each sample.

10. The samples were analyzed for hardness and results were plotted against the cumulative volume measurements. The "breakpoint" was determined from this graph, and was arbitrarily chosen as the point on the curve where the water hardness of the effluent water was equal to one-half the hardness of the influent water.

11. The resin was then quantitatively recovered from each simulator and dried to constant weight at 140° C.

12. Capacity calculations:

$$\frac{\text{Volume of water at breakpoint (ml.)} \times \text{water hardness (meq/ml.)}}{\text{dry resin weight (g)}} = \frac{\text{Meq.}}{\text{dry gram}}$$

The results of these experiments are tabulated in Table I.

TABLE I

Capacity Test Results - Lab Simulator Runs

| Field Fouled Resin Sample | Resin Capacity (Meq/dry gram) | | |
|---|---|---|---|
| | Control | Low Level[1] Additives | High Level[2] Additives |
| 1606-28-1 | 2.88 | 2.93 | 3.01 |
| 1606-115-1 | 3.27 | 3.27 | 3.27 |
| 1606-116-1 | 3.14 | 3.17 | 3.16 |

[1]750 ppm sodium citrate +50 ppm Dowfax 3B2 surfactant based on salt weight.
[2]1500 ppm sodium citrate +250 ppm Dowfax 3B2 surfactant based on salt weight.

The control values for resin capacity indicate that Sample 1606-115-1 had a good capacity to begin with, so there was little potential for improvement. Resin 1606-116-1 was initially worse, and showed more improvement when regenerated with salt containing additives than when regenerated with salt only (control). Resin 1606-28-1 was initially the worst, and showed the greatest improvement in capacity.

EXAMPLE II

The following test was conducted on a water softener in service in Naperville, Ill. The purpose was to demonstrate the effect of the test additives on removal of iron and other foreign matter from the resin bed. The filtration apparatus utilized in this test consisted of a pump, a battery of three filters arranged in parallel, and two 50 gallon plastic containers. Each filter was $5\frac{1}{2}$ inches (140 mm) in diameter and was fitted with filter paper having an effective pore size of three microns.

Procedure

Backwash Cycle

1. The water (28 gallons) from the backwash prior to regeneration of the resin was directed into a 50 gallon container.

2. The water was then pumped through the filters, which were tared, and the filtrate was collected in a second 50 gallon container. A one pint (0.48 liter) sample of the filtrate was taken and acidified with a few drops of 12N HCl to keep the iron from precipitating.

3. The insoluble material (primarily precipitated iron compounds) removed during backwashing was determined from the change in filter pad weight (filterable iron) and from iron analysis of the filtrate. Filtrate iron was determined colorimetically. Backwash iron was reported as the sum of these two forms of iron.

Brine and Rinse Cycles

4. The softener was regenerated manually with brine. The amount of brine used contained 3.34 lbs. (1.52 kg) of salt.

5. The brine, slow water, and fast water rinse cycle effluents were collected together in a 50 gallon container. Total volume was 43 gallons.

6. The regeneration effluent was treated as in steps 2 and 3 to determine its iron content.

7. Total iron removed during regeneration was reported as the sum of the backwash iron and regeneration iron.

In this experiment there were five "untreated" runs followed by four "treated" runs. The treatment level was 5400 ppm sodium citrate and 400 ppm Dowfax 3B2 surfactant based on salt weight. The results are tabulated in Table II.

TABLE II

| Iron Removal from Home Water Softener | |
|---|---|
| | Total Iron* Removed |
| Untreated Run | |
| CE | 0.689 g. |
| CF | 0.675 g. |
| CG | 0.524 g. |
| CH | 0.655 g. |
| CI | 0.687 g. |
| AVG | 0.646 g. |
| Treated Run | |
| A | 0.821 g. |
| B | 0.807 g. |
| C | 0.696 g. |
| D | 0.835 g. |
| AVG | 0.790 g. |

*Calculated as $Fe_2O_3$

EXAMPLE III

The following experiments were conducted to show the effect of the surfactant, DOWFAX 3B2 on brine drainage from the salt bed.

Column Test

Two columns or burets having a 1¼ inch (32 mm) inside diameter and 20 inches (508 mm) long were filled with pellet salt and two columns were filled with a course grade of solar salt sold for water softening use. For each type of salt tested, one hundred milliliters of deionized water was added to one column, and one hundred milliliters of water containing a small amount of DOWFAX 3B2 surfactant was added to the other column. The columns were allowed to stand overnight. The next day the brine was drained into graduated cylinders, and after ten minutes of drainage time the volumes were recorded. The results are summarized in Table III.

TABLE III

| Drainage Test #1 (columns) | | |
|---|---|---|
| | Water In | Brine Out |
| Pellets | | |
| Without Surfactant | 100 ml. | 103 ml. |
| With Surfactant | 100 ml. | 109 ml. |
| Solar Salt | | |
| Without Surfactant | 100 ml. | 100 ml. |
| With Surfactant | 100 ml. | 108 ml. |

This test indicated that more brine was drained with surfactant present.

Brine Tank Simulator Test

The brine tank test apparatus consisted of transparent cylinders having an 8½ (216 mm) inside diameter, 30 inches (762 mm) high, each fitted with a siphon tube and a plastic support grid supported within the cylinder, 1½ inches (38 mm) above the bottom. The following procedure was used to cycle the tanks.

1. Thirty pounds (13.61 kg) of pellet salt were added to each tank.

2. 1930 ml. of deionized water (with and without surfactant) were added to each tank. The starting solution level was marked on the tank.

3. After two days, the brine was drained and the brine volume was recorded.

4. Deionized water was added to refill the apparatus to the original fill mark. The volume of water added was recorded. (This technique is analogous to the mechanism of the float valve that normally controls water addition into the brine tank.)

5. Steps 3 and 4 were repeated until a total of five cycles had been completed.

The results are tabulated in Table IV.

TABLE IV

| | Brine Drainage Test #2 (Simulated Brine Tanks) | | | | | |
|---|---|---|---|---|---|---|
| | Control | | 0.03% DOWFAX | | 0.30% DOWFAX | |
| Cycle | ML $H_2O$ in | ml Brine out | ml $H_2O$ in | ml brine out | ml $H_2O$ in | ml brine out |
| 1 | 1930 | 2076 | 1930 | 2113 | 1930 | 2119 |
| 2 | 1898 | 2136 | 1989 | 2233 | 1978 | 2237 |
| 3 | 1932 | 2163 | 2020 | 2250 | 1981 | 2231 |
| 4 | 1926 | 2107 | 2019 | 2283 | 1984 | 2256 |
| 5 | 1939 | 2180 | 1956 | 2216 | 1987 | 2252 |
| TOTAL | 9,625 | 10,662 | 9,914 | 11,095 | 9,860 | 11,095 |

Comparing the volume of brine extracted with DOWFAX versus the control in cycle 1, in which an equal volume of water was initially added to each tank, 1.8 per cent more brine was drained when 0.03% DOWFAX was present and 2.1 per cent more brine was drained when 0.30% DOWFAX was present. Making a similar comparison of total drainage with and without the surfactant, 4.1 per cent more brine was drained, whether 0.03% DOWFAX or 0.30% DOWFAX was used, compared to the control.

EXAMPLE IV

The effect of the improved salt composition to reduce caking and bridging of salt pellets in the dry salt zone of a water softener salt tank was studied qualitatively in the brine tank test apparatus described in Example III. It was observed during the various tests that when a blue dye was added to the water, migration of the dyed brine into the dry salt was significantly lower when the surfactant was present in the water.

|  | Dry Migration into the Dry Salt Bed (one cycle) |
|---|---|
| Without Surfactant | 2.5 inches (63 mm) |
| With Surfactant | 1.0 inches (25 mm) |

After ten cycles using pellets, with and without the test formula, it was observed that where the additives were not present in the brine, the entire mass of pellets caked in the tanks. Where the additives were present in the brine, pellets did not cake in the tanks.

EXAMPLE V

The ability of the test formula to solubilize or prevent formation of iron scum in a water softener brine tank was also tested in the brine tank test apparatus described previously.

Iron in Salt

1. Evaporated salt containing roughly 0.4 ppm of iron (expressed as elemental iron) was produced from Kansas rock salt deposits. One sample of this salt was formulated with 0.15% by weight sodium citrate (expressed as anhydrous weight) and 0.025% by weight DOWFAX 3B2; nothing was added to the other salt sample. Each sample was then pelletized, using conventional commercial equipment. Thirty pounds of the salt with additives was placed in a first brine tank test apparatus as described in Example III, and an equal weight of the salt without additives was placed in each of second and third brine tank test apparatuses. The first and second apparatuses were filled and drained with deionized water ten times in the manner described in Example III. The tank containing salt without additives showed a pronounced brown scum, indicating the presence of iron leached from the salt, while the tank containing salt with additives showed little or no scum.

2. 1930 milliliters of water containing 0.037% sodium citrate (expressed as anhydrous weight) and 0.006% DOWFAX 3B2 were added to the third tank apparatus just described, containing salt without additives. The brine in the tank thus contained about the same amount of sodium citrate and DOWFAX 3B2 as it would if 0.15% sodium citrate and 0.025% DOWFAX 3B2 had been originally formulated into the dry salt. The third tank was then cycled 10 times as described in Example III, except that the water with additives, instead of deionized water, was used for cycling. At the end of the test the third tank showed little or no visible scum.

3. The three brine tanks just described were then filled with sufficient deionized water to dissolve or suspend the contents, and the water and any scum were quantitatively removed and filtered through filter paper having a pore size of about two microns. The filter paper for the first tank, representing salt formulated with the additives, showed virtually no stain. The filter paper for the second tank, representing salt without additives, showed a severe brown stain. The filter paper for the third tank, representing salt without additives cycled with water containing additives, showed just a trace of brown staining.

This example demonstrates the ability of salt formulas containing the additives taught herein to prevent the formation of scum within the brine tank and also demonstrates that the invention can be practiced by adding sodium citrate and one of the surfactants disclosed herein directly to the water cycled through the brine tank.

To test the ability of the test formula to remove an existing iron scum from the brine tank, iron scums were formed in two brine tank test apparatuses in the same manner as for the first brine tank test apparatus in part 2 of this example. One of the scums was treated by filling the brine tank to the fill line with a solution containing 0.13% sodium citrate and 0.006% DOWFAX 3B2 in deionized water. The other scum was treated by filling the brine tank to the fill line with deionized water containing 0.13% sodium citrate and no surfactant. The scum in the tank treated with sodium citrate and DOWFAX 3B2 was removed more quickly and to a greater degree than the scum in the tank treated with sodium citrate only. This demonstrates that the invention produced unexpectedly better results than treatment with sodium citrate only.

Iron In Water

High purity evaporated salt (99.95% purity) produced from Louisiana salt domes was formed into pellets using conventional pelletizing machinery. Pellets were placed in each of three brine tank test apparatuses as previously described. The first test apparatus was cycled ten times by adding deionized water and discharging the resulting brine. The second test apparatus was cycled ten times by adding hard water containing about one ppm iron and discharging the resulting brine. The third test apparatus was cycled in the same manner with hard water treated by adding 250 ppm sodium citrate and 18 ppm DOWFAX 3B2. (The same concentrations could alternately be provided by a dry composition of salt with 900 ppm sodium citrate and 75 ppm of DOWFAX 3B2). The iron was quantitatively removed and analyzed colorimetrically, with the results tabulated in Table 5:

TABLE 5

| Weight of Precipitated Iron ($Fe_2O_3$) | |
|---|---|
| Deionized Water | nil |
| Hard Water-Control | 51.6 mg |
| Hard Water-with test formula | 38.6 mg |

This demonstrates that use of the additives reduced iron precipitation in the brine tank substantially.

What is claimed is:

1. A composition for regenerating hardness cation exchange resins, comprising:

A. from about 10 ppm to about 400 ppm of an alkylated diphenyl oxide disulfonate surfactant;

B. from about 500 ppm to about 8000 ppm of an alkali metal citrate; and

C. as the remainder of the composition, sodium chloride.

2. The composition of claim 1, wherein said surfactant is selected from:

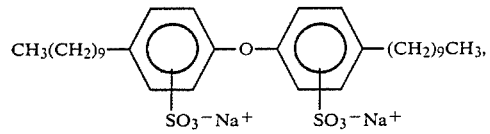

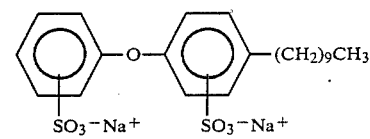

and mixtures thereof.

3. The composition of claim 1, comprising about 75 ppm of said surfactant and about 770 ppm of sodium citrate.

4. The composition of claim 3, wherein said surfactant is selected from:

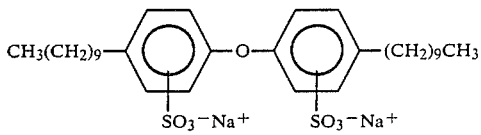

and mixtures thereof.

5. A method for regenerating the spent hardness cation exchange resin bed of a water softener, comprising the step of contacting said resin bed with an aqueous brine solution containing from about 25 to about 1200 ppm of sodium citrate and from about 0.5 to about 60 ppm of an alkylated diphenyl oxide disulfonate surfactant.

* * * * *